(12) United States Patent
K.S.V. et al.

(10) Patent No.: US 9,178,418 B2
(45) Date of Patent: Nov. 3, 2015

(54) PRE-EMPHASIS CIRCUIT

(71) Applicant: STMicroelectronics International N.V., Amsterdam (NL)

(72) Inventors: Manohar Raju K.S.V., Bangalore (IN); Hiten Advani, New Delhi (IN)

(73) Assignee: STMicroelectronics International N.V., Amsterdam (NL)

( * ) Notice: Subject to any disclaimer, the term of this patent is extended or adjusted under 35 U.S.C. 154(b) by 0 days.

(21) Appl. No.: 14/448,531

(22) Filed: Jul. 31, 2014

(65) Prior Publication Data

US 2014/0339894 A1    Nov. 20, 2014

Related U.S. Application Data

(62) Division of application No. 13/241,944, filed on Sep. 23, 2011, now Pat. No. 8,823,421.

(30) Foreign Application Priority Data

Jun. 30, 2011 (IN) .............................. 1864/DEL/2011

(51) Int. Cl.
*H03K 17/16* (2006.01)
*H03K 19/003* (2006.01)
*H02M 3/156* (2006.01)
*H04L 25/02* (2006.01)
*H04L 25/03* (2006.01)

(52) U.S. Cl.
CPC ............ *H02M 3/156* (2013.01); *H04L 25/0272* (2013.01); *H04L 25/0286* (2013.01); *H04L 25/03343* (2013.01); *H04L 25/03878* (2013.01); *Y10T 307/352* (2015.04); *Y10T 307/549* (2015.04)

(58) Field of Classification Search
CPC ............ H04L 25/0272; H04L 25/0286; H04L 25/03834; H04L 7/0054; H04L 25/0278; H04L 25/0298; H04L 7/0332; H04L 7/042; H03K 19/017563; H03K 19/018521; H03K 5/151
USPC ..................... 327/18, 108; 375/295
See application file for complete search history.

(56) References Cited

U.S. PATENT DOCUMENTS

| | | | |
|---|---|---|---|
| 7,236,018 B1 | 6/2007 | Wang et al. | |
| 7,830,167 B2 * | 11/2010 | Ono et al. | ...................... 326/27 |
| 8,358,156 B1 * | 1/2013 | Abugharbieh et al. | ....... 327/108 |
| 8,446,172 B2 | 5/2013 | Chan et al. | |
| 8,493,103 B2 | 7/2013 | Fukuda et al. | |
| 8,903,246 B2 * | 12/2014 | Wieland et al. | ............... 398/135 |
| 2005/0093580 A1 | 5/2005 | Baig et al. | |
| 2008/0107423 A1 | 5/2008 | Lee et al. | |
| 2009/0296851 A1 * | 12/2009 | Ono et al. | ..................... 375/295 |
| 2010/0182050 A1 | 7/2010 | Markozen et al. | |
| 2012/0062143 A1 | 3/2012 | Sugawara et al. | |
| 2012/0280724 A1 | 11/2012 | Chan et al. | |
| 2013/0003882 A1 | 1/2013 | K.S.V. | |

* cited by examiner

*Primary Examiner* — Vibol Tan
(74) *Attorney, Agent, or Firm* — Gardere Wynne Sewell LLP

(57) ABSTRACT

An embodiment of a pre-emphasis circuit, an embodiment of a method for pre-emphasizing complementary single-ended signals, an embodiment of a transmitter, and an embodiment of a communication system.

22 Claims, 9 Drawing Sheets

PRE-EMPHASIS CIRCUIT

PRIORITY CLAIM

The present application is a Divisional of copending U.S. patent application Ser. No. 13/241,944 filed Sep. 23, 2011, which application claims the benefit of Indian Patent Application No. 1864/DEL/2011, filed Jun. 30, 2011; all of the foregoing applications are incorporated herein by reference in their entireties.

TECHNICAL FIELD

An embodiment broadly relates to a pre-emphasis circuit, to a method of pre-emphasizing complementary single-ended signals, to a transmitter, and to a communication system.

BACKGROUND

Currently, general-purpose data ports on, e.g., portable devices are used not only for data communication, but also for various other purposes such as charging the portable device, audio functions, universal asynchronous receiver/transmitter (UART) functions, etc. The multiplexing of all these features on high-speed serial data lines is typically done through additional multiplexing (muxing) circuitry on the data lines, or just by tying together with proper "enable" control. However, this type of multiplexing usually results in high capacitive loads, which in turn, lead to violation of the maximum slew rate and/or the minimum rise time, and hence, violation of the eye template. Recovering the slew-rate is important while transmitting differential data which are generally have low-amplitude signal swings.

In the recovery process, the pre-emphasis is typically done on single-ended data of the differential signals (e.g. difference of two single-ended signals) by taking into consideration the actual signal level, high and low output voltage levels (VoH, VoL), current sources in the case of current mode circuits, and termination resistances. While doing pre-emphasis, it may be important to retain the other signal quality parameters such as the common mode of the differential signals. However, when VoL=0, then some pre-emphasis schemes disturb the common mode, which may increase the pre-emphasis current for adequate eye margins, and which may allow mismatches between rise and fall behaviors of single-ended signals.

There have been several approaches that attempt to solve the above problems. FIG. 1(a) shows a schematic diagram illustrating a current mode driver circuit used in an existing approach. In FIG. 1(a), each line 101a, 101b of the differential signal is coupled to a capacitive load 102a, 102b and a terminal resistor 104a, 104b at nodes D+, D− respectively. The constant current Isource, the effective terminal resistance Rterm, and the load capacitance Cload are chosen based on a standard protocol specification, which is typically derived from respective external constraints. The complementary data (Data-P and Data-N) drive switches M1 and M2 respectively to generate a differential voltage signal on nodes D+ and D−. Here, the differential voltage turns out to be Isource*Rterm, which is supposed to be a specification to be met. The load capacitance Cload helps to meet the slew-rate and rise-time specification of the differential signal, and subsequently in the eye-opening of the respective high-speed transmitter.

When a differential-1 signal is driven (e.g. when V(D+)>V(D−)), the following are the output waveform equations of the single-ended signals according to the circuit 100.

The single-ended rise behavior is as follows:

$$Vdp(t)=Isource*Rterm(1-e^{-t/(Rterm*Cload)}) \quad (1A)$$

And the single-ended fall behavior is as follows:

$$Vdn(t)=Vmax(e^{-t/(Rterm*Cload)}) \quad (1B)$$

However, the load capacitance $C_{load}$ may become more than expected due to the sharing of the same data line with other drivers, or external factors such as trace, etc., thus subsequently affecting the eye diagram of the respective high-speed transmitter. FIG. 1(b) shows waveforms illustrating performance of the circuit of FIG. 1(a). Here, lines 112a, 112b, and 122 show relevant signals under a specified load condition while lines 114a, 114b, and 124 show relevant signals under additional load conditions. For example, lines 112a, 112b include single-ended waveforms of the differential driver signals based on Data-P and Data-N (FIG. 1(a)) respectively, while line 122 includes the resulting differential waveform. With an additional load (not shown) to the specified load, the performance of the circuit is changed. Lines 114a and 114b include the corresponding single-ended waveforms of the differential driver signals, and line 124 includes the corresponding differential waveform. In the example shown in FIG. 1(b), the eye margin at the specified load is about 65 millivolts (mV), which is reduced significantly to about 16 mV with the additional load.

SUMMARY

An embodiment is a circuit that improves the eye-opening performance at additional capacitive loads as compared to a conventional circuit.

In accordance with an embodiment, a pre-emphasis circuit includes:
 a control signal unit configured to apply currents for rise pre-emphasis and fall pre-emphasis respectively of complimentary single-ended signals. The control signal unit may include:
 a first control signal generator configured to apply a current to a first output node of a signal transmitter for rise pre-emphasis of a first single-ended signal, while applying the current to a second output node of the signal transmitter for fall pre-emphasis of a complimentary second single-ended signal; and
 a second control signal generator configured to apply the current to the second output node for rise pre-emphasis of the complementary second single-ended signal, while applying the current to the first output node for fall pre-emphasis of the first single-ended signal.

The pre-emphasis circuit may further include a first transistor device configured to be coupled between the first control signal generator and the first output node for applying the current to the first output node for rise pre-emphasis of the first single-ended signal.

The pre-emphasis circuit may further include a second transistor device configured to be coupled between the second control signal generator and the first output node for applying the current to the first output node for fall pre-emphasis of the first single-ended signal.

The pre-emphasis circuit may further include a first resistor configured to be coupled between the second transistor device and a ground.

The pre-emphasis circuit may further include a third transistor device configured to be coupled between the second control signal generator and the second output node for applying the current to the second output node for rise pre-emphasis of the second single-ended signal.

The pre-emphasis circuit may further include a fourth transistor device configured to be coupled between the first control signal generator and the second output node for applying the current to the second output node for fall pre-emphasis of the second single-ended signal.

The pre-emphasis circuit may further include a second resistor configured to be coupled between the fourth transistor device and a ground.

The control signal may include a sub-symbol signal.

The control signal may include a symbol signal.

An embodiment is a method for pre-emphasizing complementary single-ended signals, the method including applying currents for rise pre-emphasis and fall pre-emphasis respectively of the complimentary single-ended signals.

Applying currents for rise pre-emphasis and fall pre-emphasis respectively of the complimentary single-ended signals may include:

applying a current to a first output node of a signal transmitter for rise pre-emphasis of a first single-ended signal, while applying the current to a second output node of the signal transmitter for fall pre-emphasis of a complimentary second single-ended signal; and applying the current to the second output node for rise pre-emphasis of the complementary second single-ended signal, while applying the current to the first output node for fall pre-emphasis of the first single-ended signal.

Applying the current to the first output node for rise pre-emphasis of the first single-ended signal may include coupling a first transistor device between the first control signal generator and the first output node.

Applying the current to the first output node for fall pre-emphasis of the first single-ended signal may include coupling a second transistor device between the second control signal generator and the first output node.

The method may further include coupling a first resistor between the second transistor device and a ground.

Applying the current to the second output node for rise pre-emphasis of the second single-ended signal may include coupling a third transistor device between the second control signal generator and the second output node.

Applying the current to the second output node for fall pre-emphasis of the second single-ended signal may include coupling a fourth transistor device between the first control signal generator and the second output node.

The method may further include coupling a second resistor between the fourth transistor device and a ground.

An embodiment is a transmitter including:

a signal generating module configured to generate complementary single-ended signals;

a pair of conductors configured to carry the complementary single-ended signals from the signal generating module to respective output nodes; and a pre-emphasis circuit including:

a control signal unit configured to apply currents for rise pre-emphasis and fall pre-emphasis respectively of complimentary single-ended signals.

An embodiment is a communication system including:

a transmitter;

a receiver configured to receive signals transmitted from the transmitter via a data link;

wherein the transmitter includes:

a signal generating module configured to generate complementary single-ended signals;

a pair of conductors configured to carry the complementary single-ended signals from the signal generating module to respective output nodes; and a pre-emphasis circuit including:

a control signal unit configured to apply currents for rise pre-emphasis and fall pre-emphasis respectively of complimentary single-ended signals.

BRIEF DESCRIPTION OF THE DRAWINGS

One or more embodiments will be better understood from the following written description, by way of example only, and in conjunction with the drawings, in which.

DETAILED DESCRIPTION

Figure 1A:
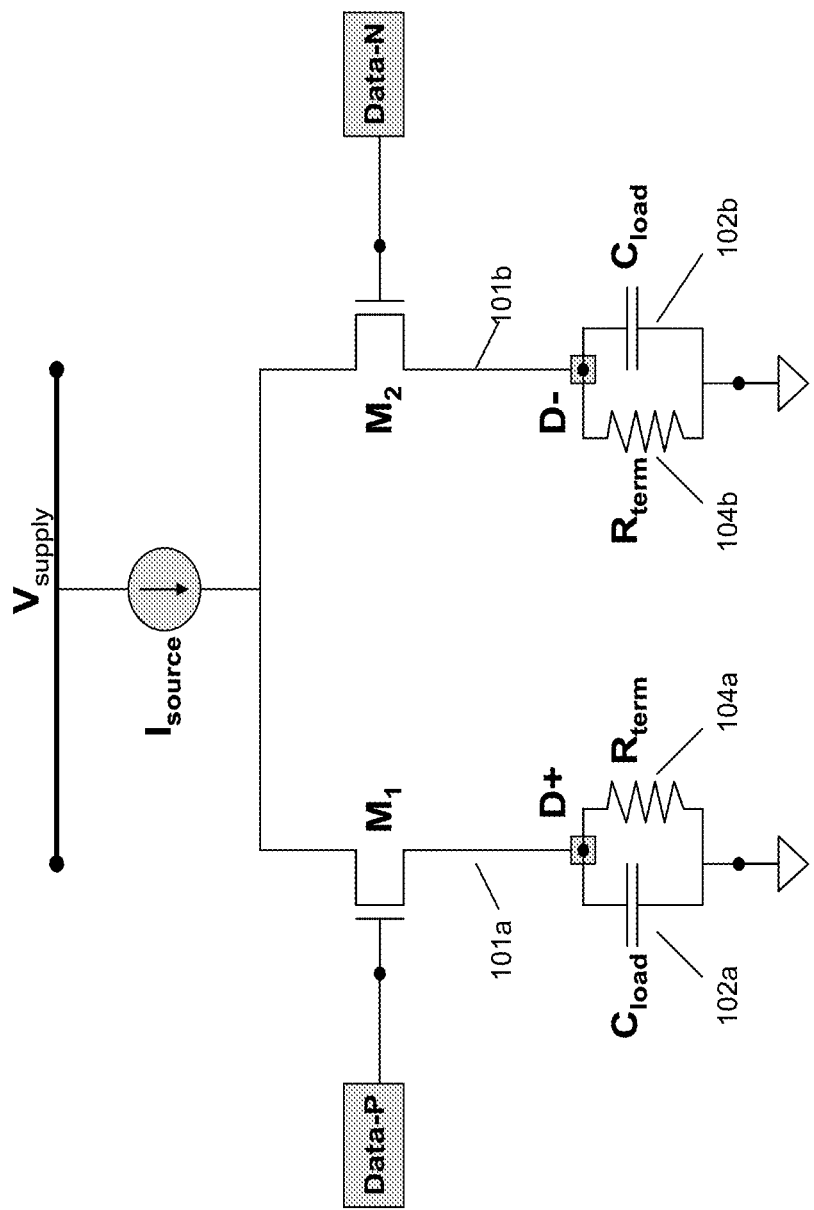
FIG. 1(a) is a schematic diagram illustrating an existing current mode driver circuit of a high-speed transmitter.
Figure 1B:
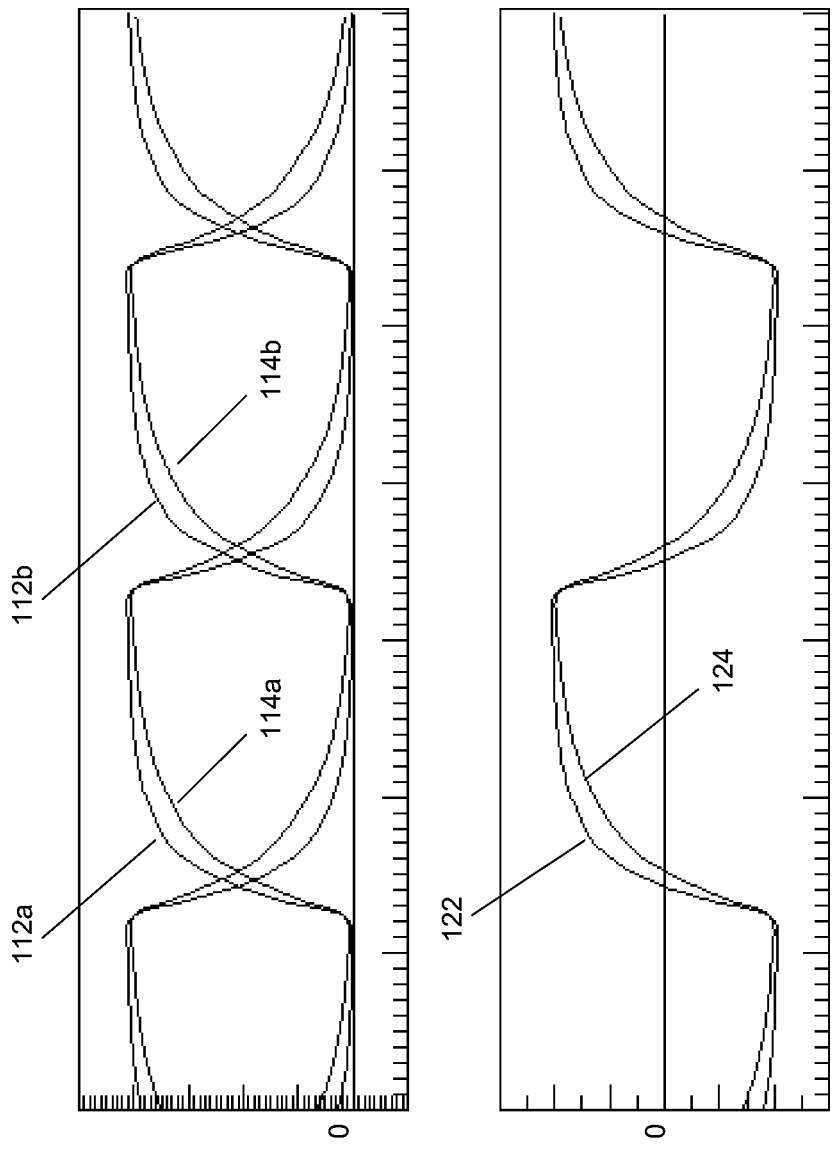
FIG. 1(b) includes waveforms illustrating performance of the circuit of FIG. 1(a) in an example implementation.
Figure 2A:
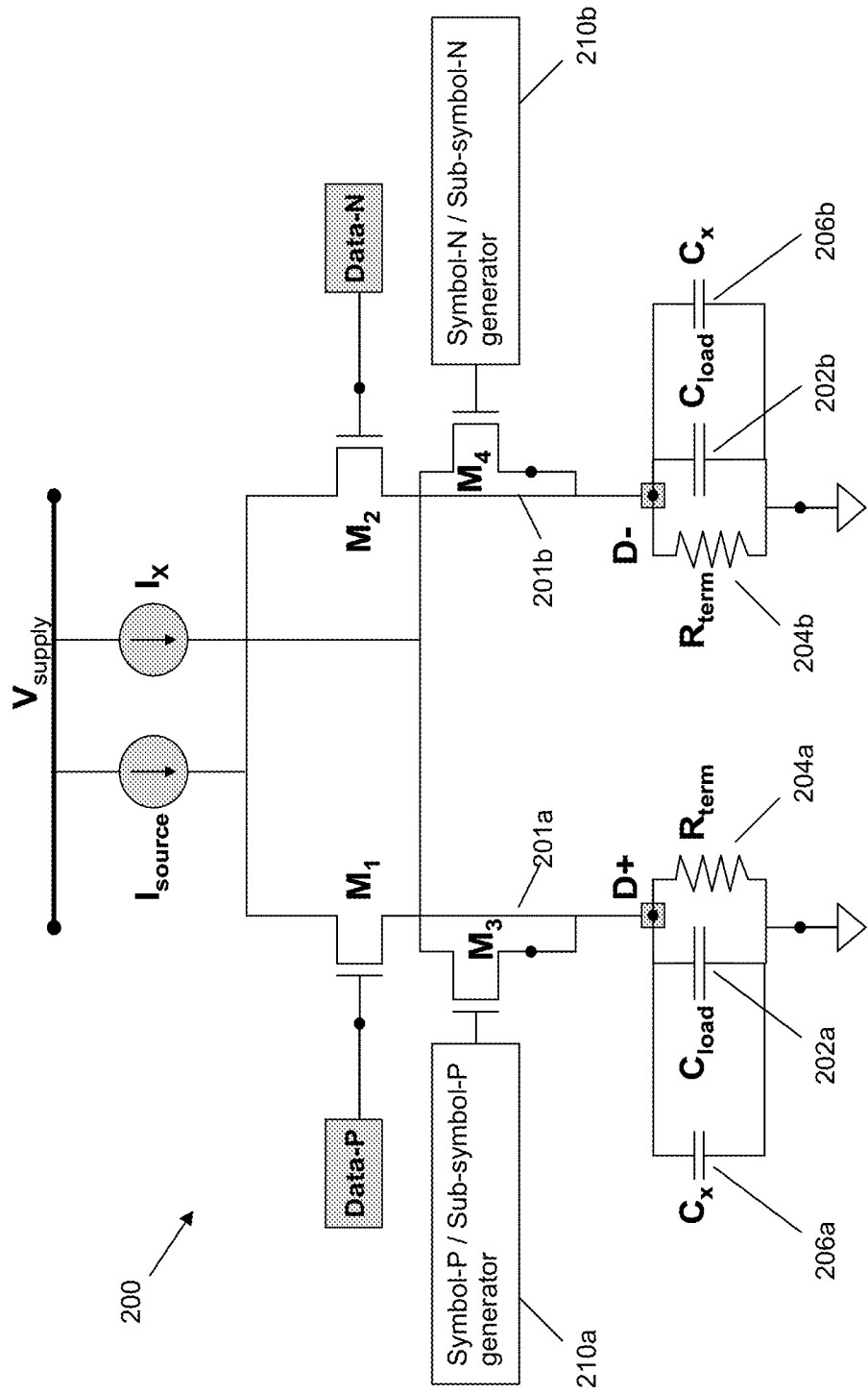
FIG. 2(a) is a schematic diagram illustrating an embodiment of a pre-emphasis circuit with an improved eye-opening performance.

FIG. 2(a) is a schematic diagram illustrating a pre-emphasis circuit 200 with an improved eye-opening performance. In the pre-emphasis circuit 200, the additional capacitive load 206a, 206b (each with capacitance Cx) is shown as being coupled in parallel to the respective specified load 202a, 202b (each with capacitance Cload) and terminal resistor Rterm 204a, 204b (each with resistance Rterm). In addition, a control signal, which is generated by a control signal unit after a rise of the single-ended Data-P/N signal respectively, is used for the rise pre-emphasis. Here, the control signal is in the form of a symbol or sub-symbol (e.g. glitch) signal generated by the symbol/sub-symbol generator 210a, 210b. The /symbol signal is driven to an additional switch M3, M4 (e.g. transistors) which pumps an additional current Ix onto the respective data line 201a, 201b to bring back the slew-rate during the rising edge of single-ended signal. For example, switch M3 is coupled between the symbol-P/sub-symbol-P signal generator 210a and node D+, and switch M4 is coupled between the symbol-N/sub-symbol-N signal generator 210b and node D−. The remaining components are the same as those shown in FIG. 1(a).

In the pre-emphasis circuit 200, the single-ended rise only pre-emphasis affects both the rising and falling slew rate of the differential signal. This is because differential voltage= [V(D+)−V(D−)], where V(D+) and V(D−) are the voltage levels at nodes D+ and D− respectively. Since the pre-emphasis is only on the rising edge of the single-ended data for a fixed current Ix, and its symmetric behavior is not done on the falling edge, the data eye-opening may be imperfect and un-symmetric.

When a differential-1 signal is driven (e.g. when V(D+) >V(D-)), the following are the output waveform equations of the single-ended signals of the circuit 200.

The single-ended rise behavior is as follows:

$$Vdp(t)=(Isource+Ix)*Rterm(1-e^{-t/Rterm*(Cload+Cx)}) \quad (2A)$$

And the single-ended fall behavior is as follows:

$$Vdn(t)=Vmax(e^{-t/Rterm*(Cload+Cx)}) \quad (2B)$$

From the above equations (2A) and (2B), it can be seen that during rise, the additional load capacitance Cx is countered by the additional current Ix. However, during fall, there is no such facility since VoL=0. Since the main discharging relies on the terminal resistor, constant current-based discharging may face design and specification issues in this design.

Figure 2B:
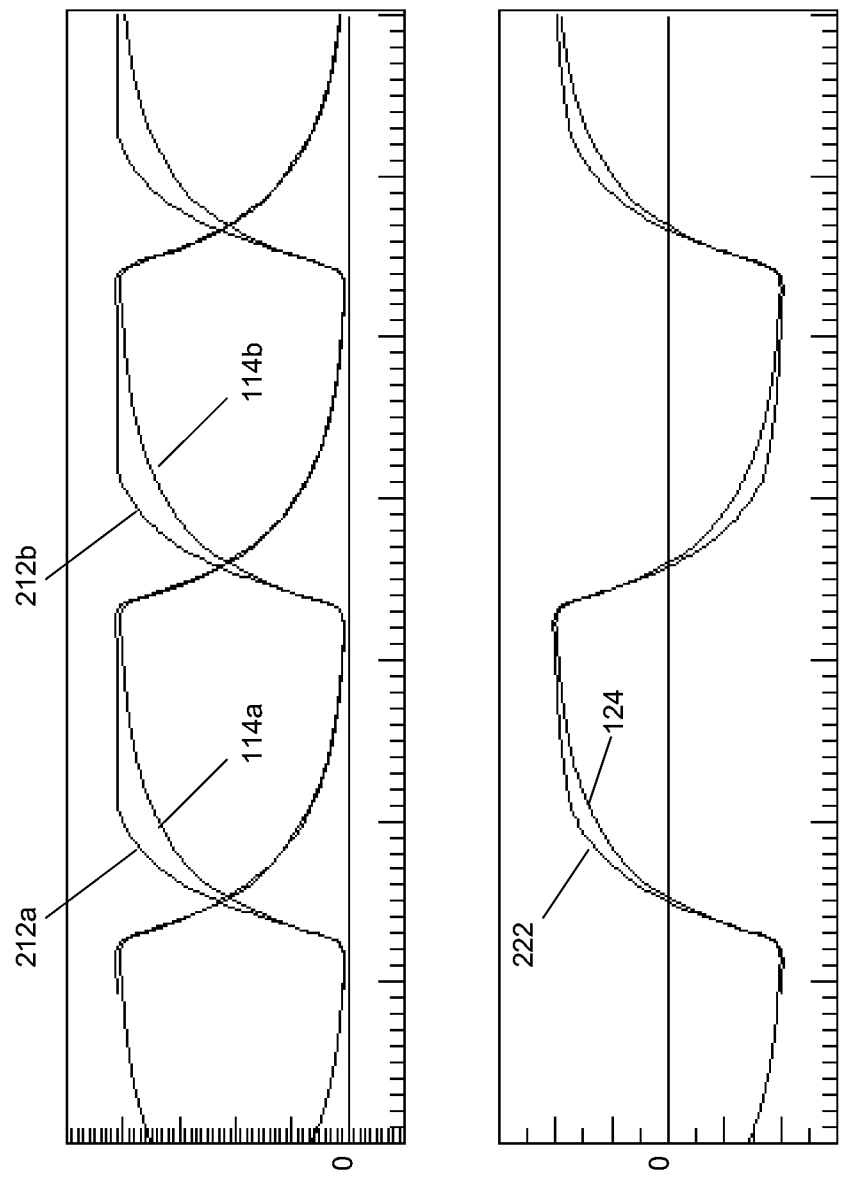
FIG. 2(b) includes waveforms illustrating performance of the circuit embodiment of FIG. 2(a) in an example implementation.

FIG. 2(b) shows waveforms illustrating performance of the circuit 200 of FIG. 2(a) in an example implementation. In FIG. 2(b), lines 114a, 114b and 124 show waveforms of relevant signals under additional load condition, without pre-emphasis. Lines 212a, 212b and 222 show the relevant signals under additional load condition, but with the rise-only pre-emphasis as described in FIG. 2(a) enabled.

As can be seen from lines 212a and 212b (showing the single-ended waveforms), the rise behavior is enhanced when using the pre-emphasis circuit 200, while the fall behavior remains unchanged, as compared to the case without pre-emphasis. As can be further seen from line 222, both the rise and fall behaviors of the corresponding differential signal have been changed, as the differential voltage is the difference of the two single-ended voltages (as described above). The eye-margin when using the pre-emphasis circuit 200 is increased to about 58 mV.

Figure 2C:
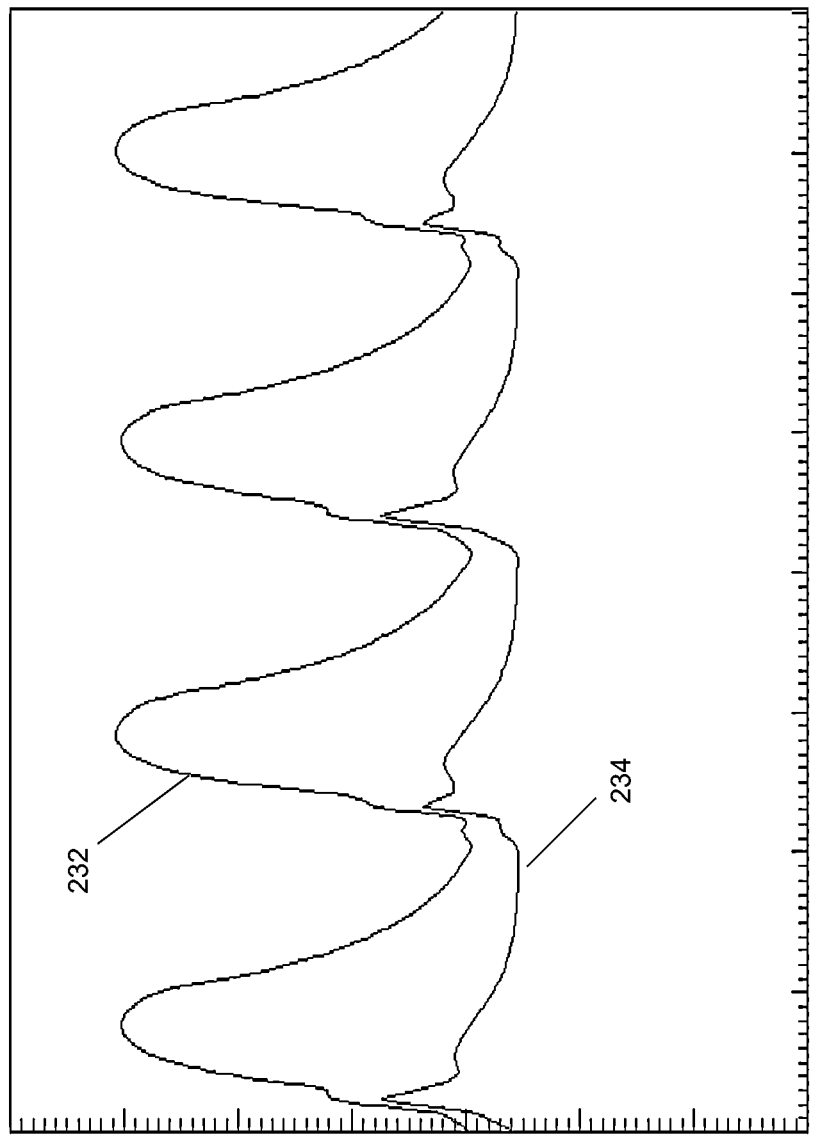
FIG. 2(c) includes waveforms comparing common mode behavior of single-ended signals Vdp and Vdn in an example implementation.

FIG. 2(c) show waveforms comparing common mode behavior of single-ended signals Vdp and Vdn in an example implementation. Without pre-emphasis, the common mode variation is about 5 mV (as shown by line 234). Using the pre-emphasis circuit 200 of FIG. 2(a), the common mode variation increases to about 30 mv (as shown by line 232). In other words, some of the energy used for pre-emphasis is not converted into useful differential energy.

Figure 3A:
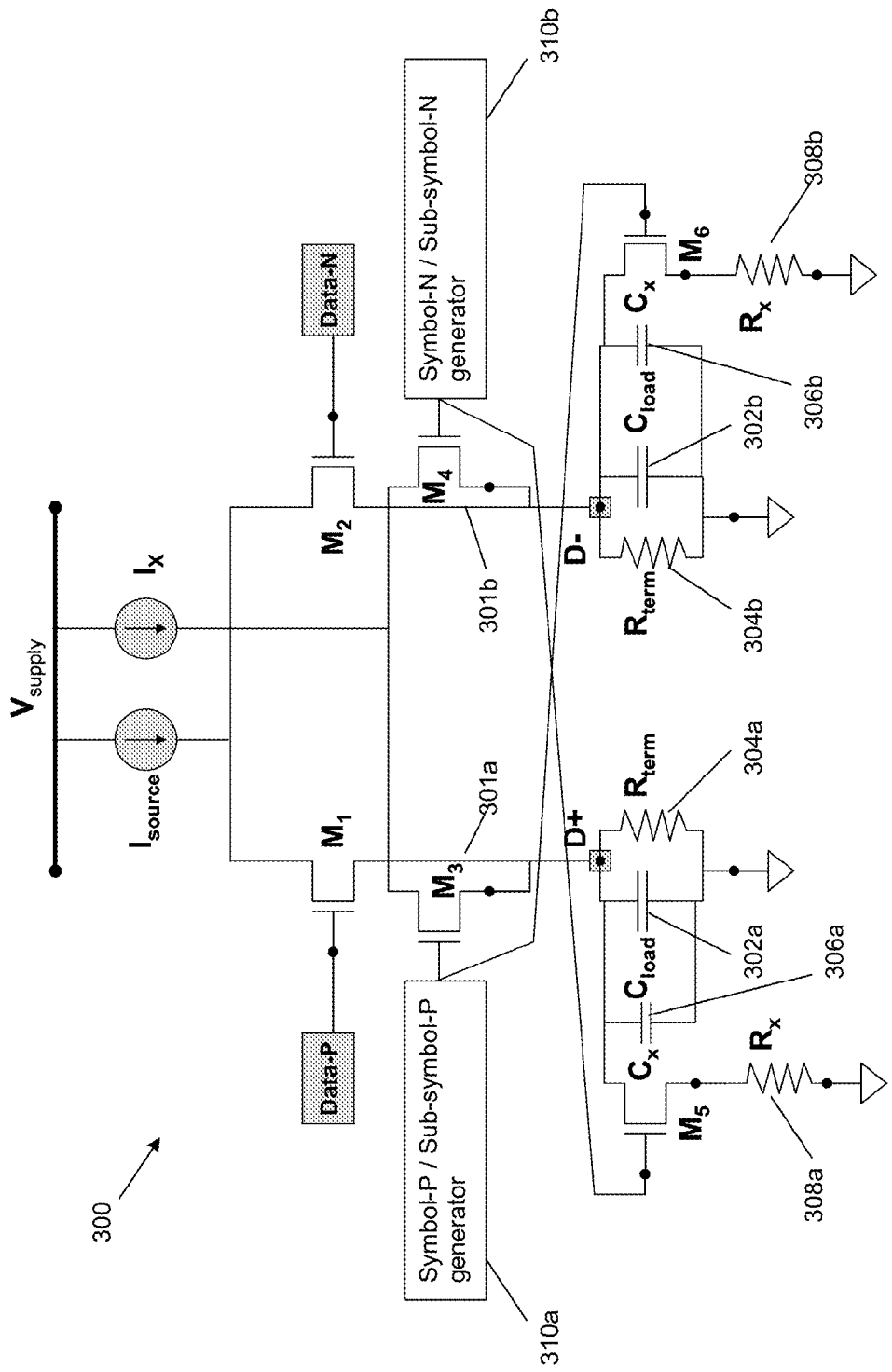
FIG. 3(a) is a schematic diagram illustrating a pre-emphasis circuit according to an embodiment.

FIG. 3(a) is a schematic diagram illustrating a pre-emphasis circuit 300 according to an embodiment. In the circuit 300, the specified load 302a, 302b, the terminal resistor 304a, 304b, the additional load 306a, 306b and the complementary data (Data-P and Data-N) are coupled to single-ended data lines 301a, 301b in the same manner as described above with respect to FIG. 2(a). For example, the complementary data (Data-P and Data-N) drive switches M1 and M2 respectively to generate a differential voltage signal on nodes D+ and D-. The additional load 306a, 306b is shown as being coupled in parallel to the respective specified load 302a, 302b and terminal resistor 304a, 304b.

In an embodiment, a control signal, which is generated by a control signal unit, is used for both rise and fall pre-emphasis of the complementary single-ended signals. Here, the control signal is in the form of a symbol or sub-symbol signal generated by the symbol/sub-symbol generator 310a, 310b. Switch M3 is coupled between the symbol-P/sub-symbol-P signal generator 310a and node D+, and switch M4 is coupled between the symbol-N/sub-symbol-N signal generator 310b and node D-. In addition, as shown in FIG. 3(a), switch M5 is coupled between the symbol-N/sub-symbol-N generator 310b, node D+ and an additional resistor 308a. Similarly, switch M6 is coupled between the symbol-P/sub-symbol-P generator 310a, node D- and an additional resistor 308b. The additional resistor 308a, 308b each has a resistance Rx. Switches M3, M4, M5, M6 are transistors in an embodiment.

The pre-emphasis circuit 300 of the embodiment is capable of both single-ended rise and fall pre-emphasis. The single-ended rise pre-emphasis implementation is the same as described above with respect to FIG. 2(a). The single-ended fall pre-emphasis involves the additional resistor 308a, 308b and switches M5 and M6. Whenever single-ended rise pre-emphasis is in progress with additional current Ix, the complementary single-ended fall pre-emphasis can be done with additional resistor 308a, 308b by driving M5, M6 with the same sub-symbol/symbol signal.

For example, a sub-symbol/symbol signal from the sub-symbol-P/symbol-P generator 310a is driven to switch M3 to pump an additional current Ix onto data line 301a at node D+ to bring back the slew-rate during the rising edge of single-ended Data-P signal. At the same time, the same sub-symbol/symbol signal is also driven to switch M6 to pump the additional current Ix onto the combination of terminal resistor 304b and additional resistor 308b, thereby bringing back the slew-rate during the falling edge of the complementary Data-N signal. Similarly, the sub-symbol/symbol signal used for the rise pre-emphasis of Data-N signal is also used for the fall emphasis of the Data-P signal.

In the pre-emphasis circuit 300, the single-ended rise behavior is as follows:

$$Vdp(t)=(Isource+Ix)*Rterm(1-e^{-t/(Rterm*(Cload+Cx))}) \quad (3A)$$

The single-ended fall behavior is as follows:

$$Vdn(t)=Vmax(e^{-t/(Rterm//Rx)*(Cload+Cx)}) \quad (3B)$$

where Rterm//Rx is the effective resistance of the combination of the respective terminal resistor 304a, 304b and additional resistor 308b, 308b.

Figure 3B:
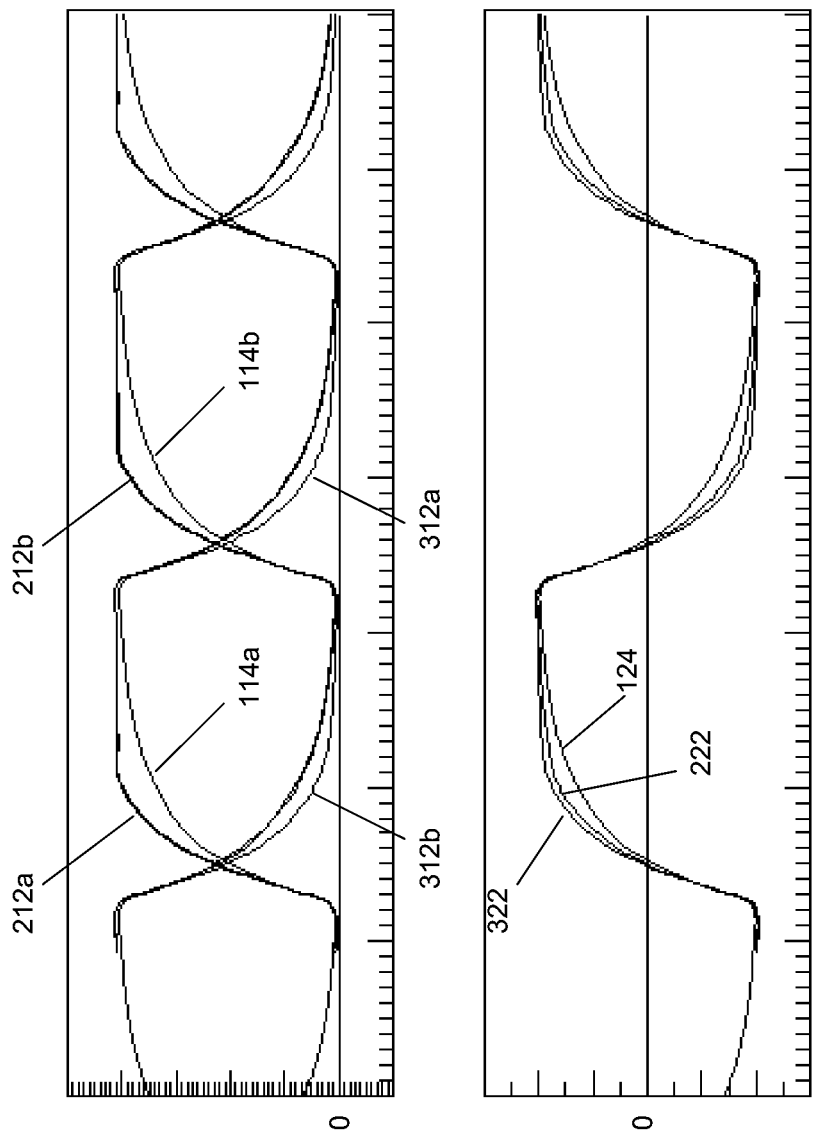
FIG. 3(b) includes waveforms illustrating performance of the circuit embodiment of FIG. 3(a) in an example implementation.

FIG. 3(b) shows waveforms illustrating performance of the circuit of FIG. 3(a) in an example implementation. In FIG. 3(b), lines 114a, 114b and 124 show waveforms of relevant signals under additional load condition, without pre-emphasis. Lines 212a, 212b and 222 show the relevant signals under additional load condition, but with the rise-only pre-emphasis, as described above with respect to FIG. 2(b). Lines 312a, 312b show waveforms of the single-ended signals, and line 322 shows waveform of the differential signal under additional load condition, but with the both rise and fall pre-emphasis as described in FIG. 3(a) enabled.

As can be seen from FIG. 3(b), the slew-rate is recovered during both the rising edge and falling edge using the pre-emphasis circuit 300 of the embodiment of FIG. 3(a). Thus, in the pre-emphasis circuit 300 according to an embodiment, for the additional Ix, a better eye-margin can be achieved. For example, the eye-margin is increased to about 85 mV in the implementation shown in FIG. 3(b).

Figure 3C:
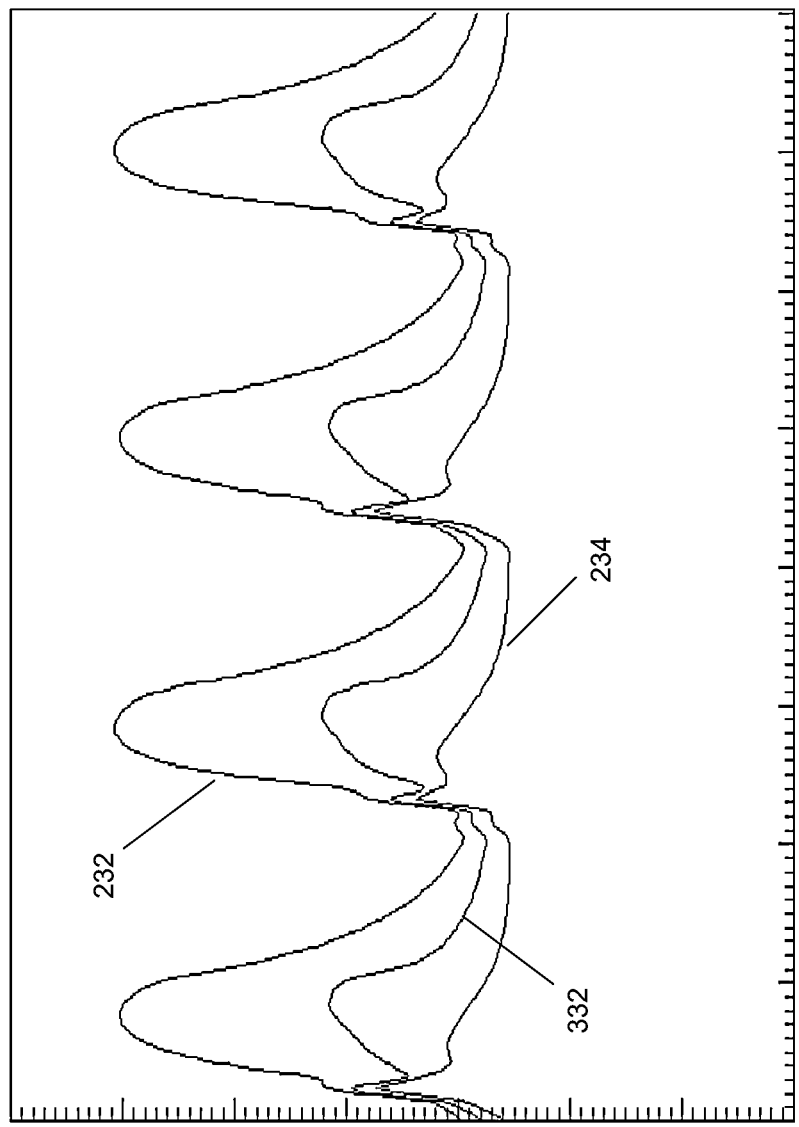
FIG. 3(c) includes waveforms comparing common mode behavior of single-ended signals Vdp and Vdn in an example implementation.

In addition, the common-mode variation is better controlled in the embodiment using the pre-emphasis circuit 300. FIG. 3(c) shows waveforms comparing common mode behavior of single-ended signals Vdp and Vdn in an example implementation. Here, lines 232 and 234 are the same as those described above with respect to FIG. 2(c), while line 332 shows the common mode behavior of the pre-emphasis circuit 300. After rise and fall pre-emphasis as described above, the common mode variation is reduced to about 8 mV relative to rise pre-emphasis only.

The pre-emphasis circuit of an embodiment can be used in various high-speed transmission applications, including in Universal Serial Bus (USB) data transmission, driver-based serial links, M-Physical Layer specification (M-PHY), DisplayPort (DP), etc. For the same source current Isource, a better eye-opening performance can be achieved using the pre-emphasis circuit of an embodiment. The common mode of the differential signal may be maintained as the rise and fall pre-emphases are balanced. In addition, the fall pre-emphasis can be carried out even at the condition when VoL=0.

Figure 4:
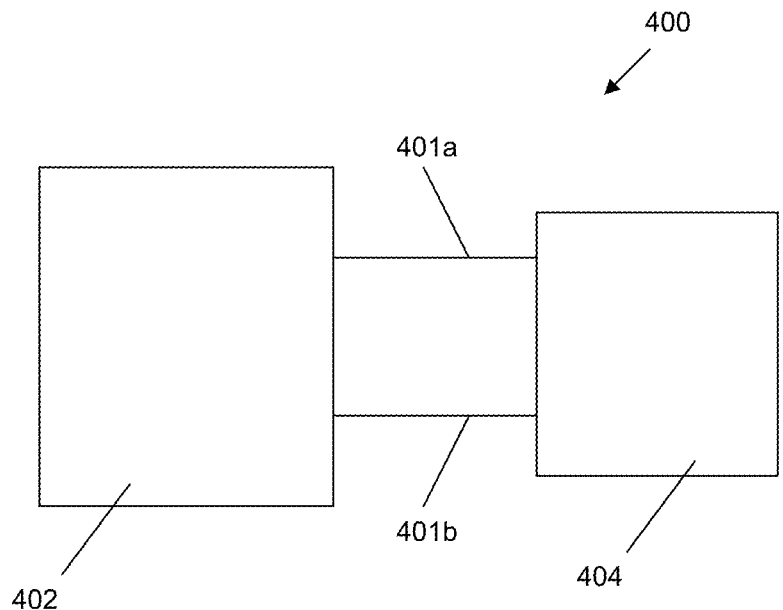
FIG. 4 is a block diagram illustrating a transmitter according to an embodiment.

FIG. 4 shows a block diagram illustrating a transmitter 400 according to an embodiment. The transmitter 400 includes a signal generating module 402, a pair of conductors (e.g. data lines 401a, 401b) for carrying the single-ended signals generated from the signal generating module 402 to respective output nodes, and a pre-emphasis circuit 404 coupled to the data lines 401a, 401b, e.g. at the output nodes, for pre-emphasizing and improving the eye-opening performance of the signals. The pre-emphasis circuit 404 is similar to the circuit as described above with respect to FIG. 3(a), although it may be similar to the circuit as described above with respect to FIG. 2(a).

Figure 5:
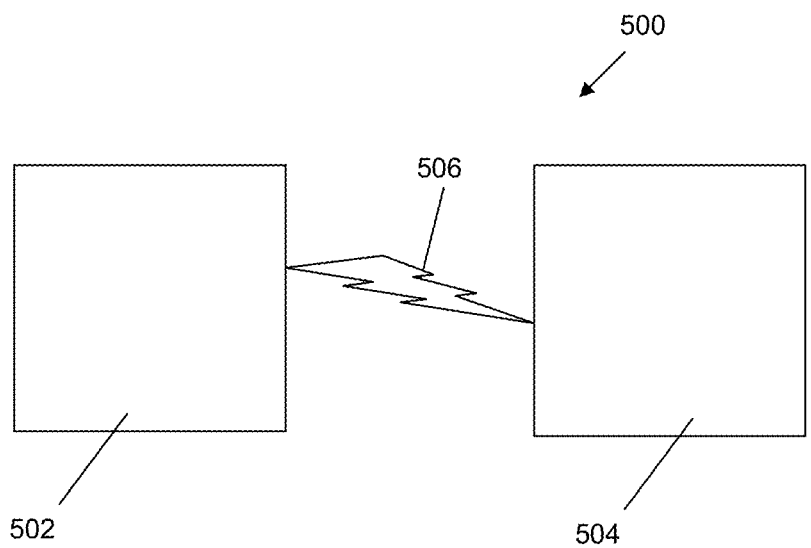
FIG. 5 is a block diagram illustrating a communication system according to an embodiment.

FIG. 5 shows a block diagram illustrating a communication system 500 according to an embodiment. The transmission system 500 includes a transmitter 502; and a receiver 504 configured to receive signals transmitted from the transmitter 502 via a data link 506. The data link 506 can be a wired connection (e.g. a high-speed serial link) or a wireless connection (e.g. Wi-Fi, Bluetooth, etc.). The transmitter 502 may be of the type as described above with respect to FIG. 4 such that both rise and fall pre-emphasis are carried out on its output signals.

While this detailed description has set forth some embodiments, other embodiments are contemplated. For example, the value of the additional current Ix and resistance Rx may be varied depending on the actual application. Furthermore, an embodiment contemplates the duals of the circuits of FIGS. 2(a) and 3(a) and the detection of a falling edge of a data signal.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A drive-signal booster, comprising:
a differential current mode driver having a first output node and a second output node;
a first control signal generator configured to output a first control signal in response to a transition of a first input signal applied to control operation of the differential current mode driver;
a first current generator configured to apply a first drive-source current signal to the first output node in response to the first control signal; and
a second current generator configured to apply a first drive-sink current signal to the second output node in response to the first control signal.

2. The drive-signal booster of claim 1 wherein the first control signal generator is configured to output the first control signal in response to a lower-to-higher transition of the input signal.

3. The drive-signal booster of claim 1 wherein the first control signal generator is configured to output the first control signal in response to a higher-to-lower transition of the input signal.

4. The drive-signal booster of claim 1 wherein the first current generator includes:
a current source configured to generate a current; and
a switch coupled in series with the current source and configured to generate the first drive-source current signal in response to the first control signal.

5. The drive-signal booster of claim 1 wherein the second current generator includes:
an impedance; and
a switch coupled in series with the impedance and configured to generate the first drive-sink current signal in response to the first control signal.

6. The drive-signal booster of claim 1, further including:
a second control signal generator configured to output a second control signal in response to a transition of a second input signal applied to control operation of the differential current mode driver; and
a third current generator configured to apply a second drive-source current signal to the first output node in response to the second control signal.

7. The drive-signal booster of claim 6 wherein:
the first input signal is complementary to the second input signal; and
the first drive-source current signal is complementary to the second drive-source current signal.

8. An integrated circuit, comprising:
a first output node;
a second output node;
a first input configured to receive a first input signal and a second input configured to receive a second input signal that is complementary to the first input signal;
a first drive circuit, including:
a first driver configured to generate a first drive signal at the first output node in response to the first input signal;
a first signal generator configured to generate a first control signal in response to a transition of the first input signal;
a second driver configured to generate a first drive-boost signal at the first output node in response to the first control signal; and
a third driver configured to generate a second drive-boost signal at the second output node in response to the first control signal; and
a second drive circuit, including:
a fourth driver configured to generate a second drive signal at the second output node in response to the second input signal;
a second signal generator configured to generate a second control signal in response to a transition of the second input signal;
a fifth driver configured to generate a third drive-boost signal at the second output node in response to the second control signal; and
a sixth driver configured to generate a second drive-boost signal at the first output node in response to the second control signal.

9. The integrated circuit of claim 8, further including an output pin coupled to the first output node.

10. The integrated circuit of claim 8 wherein:
the first input signal carries information; and
the first drive signal carries the information.

11. A drive-signal booster comprising:
a differential current mode driver having a first output node and a second output node;
a first circuit configured to source a first current to the first output node in response to a transition of a first single-ended signal;

a second circuit configured to sink a second current from the second output node in response to the transition of the first single-ended signal;

a third circuit configured to source a third current to the second output node in response to a transition of a second single-ended signal; and a fourth circuit configured to sink a fourth current from the first output node in response to the transition of the second single-ended signal.

12. The drive-signal booster of claim 11, wherein the first and second single-ended signals are complementary.

13. The drive-signal booster of claim 11, further comprising:

a first signal generator configured to generate a first control signal in response to the transition of the first single-ended signal, said first and second circuits actuated by said first control signal; and a second signal generator configured to generate a second control signal in response to the transition of the second single-ended signal, said third and fourth circuits actuated by said second control signal.

14. The drive-signal booster of claim 13, wherein the first and second control signals each comprise a sub-symbol signal.

15. The drive-signal booster of claim 13, wherein the first and second control signals each comprise a symbol signal.

16. The drive-signal booster of claim 11, further comprising a current source, and wherein the first circuit comprises a first transistor coupled in series between the current source and the first output node to control application of the first current to the first output node in response to the transition of the first single-ended signal; and wherein the third circuit comprises a second transistor coupled in series between the current source and the second output node to control application of the third current to the second output node in response to the transition of the second first single-ended signal.

17. The drive-signal booster of claim 11, wherein the second circuit comprises a third transistor coupled between the second output node and a reference node to control sinking of the second current from the second output node in response to the transition of the first single-ended signal; and wherein the fourth circuit comprises a fourth transistor coupled between the first output node and the reference node to control sinking of the fourth current from the first output node in response to the transition of the second single-ended signal.

18. The drive-signal booster of claim 17, further comprising:

a first resistor coupled in series with the third transistor; and a second resistor coupled in series with the fourth transistor.

19. The drive-signal booster of claim 11, wherein the first and third currents provide rise pre-emphasis at the first and second outputs with respect to the first and second single-ended signals.

20. The drive-signal booster of claim 11, wherein the second and fourth currents provide fall pre-emphasis at the first and second outputs with respect to the first and second single-ended signals.

21. The drive-signal booster of claim 11, wherein the first and third currents are a constant current and the second and fourth currents are a decaying current.

22. The drive-signal booster of claim 11, wherein the first and third currents are a constant current and the second and fourth currents are an exponentially decaying current.

* * * * *